Jan. 17, 1961 K. E. ROSWELL 2,968,780

SOLDERLESS CONNECTOR

Filed Jan. 20, 1959 2 Sheets-Sheet 1

INVENTOR
KENNETH E. ROSWELL
BY
Eyre, Mann & Lucas
ATTORNEYS

Jan. 17, 1961 K. E. ROSWELL 2,968,780

SOLDERLESS CONNECTOR

Filed Jan. 20, 1959 2 Sheets-Sheet 2

INVENTOR
KENNETH E. ROSWELL
BY
Eyre, Mann & Lucas
ATTORNEYS

United States Patent Office 2,968,780
Patented Jan. 17, 1961

2,968,780

SOLDERLESS CONNECTOR

Kenneth E. Roswell, Fairfield, Conn., assignor to Edwards Company Inc., a corporation of New York Filed Jan. 20, 1959, Ser. No. 787,991

7 Claims. (Cl. 339—17)

The present invention relates to electrical connectors or terminals, more particularly to electrical connectors for printed circuits or the like, and comprises a novel spring clip that clamps about an edge of a panel and to which a conductor may be locked without soldering. The new clip makes firm electrical connection to such conductor and to flat conductors, such as printed circuit elements, on one or both sides of the panel. The clip in the preferred form accommodates itself to panels of different thickness and its functioning is not affected by differential expansion of the clip and panel with change in temperature, nor with changes in panel thickness created by alterations of panel moisture content. The clip is economical to manufacture, light in weight and simple to install. In prior art devices employing solder for connecting a conductor to a terminal or a terminal to a circuit element of a panel, expansion and contraction of the panel with change in temperature or moisture content tends to crack the solder and shorten the useful life of the device. The new connector which provides permanent and good electrical connection between circuit elements of a panel and a conductor to be connected thereto, and yet requires no solder, thus has a longer useful life than such prior art devices.

Briefly, the new terminal is a generally U-shaped clip of spring metal. The legs of the clip have holes punched therein, which, when the clip is mounted on a printed circuit panel, are in alignment with a suitable wire receiving hole through the panel. Preferably, the hole in one leg of the clip is pertused or embossed to provide a lip which penetrates the hole in the panel and keeps the clip in place on the panel. The other leg of the clip is formed with at least one spring finger the end of which partially overlies the aligned holes so that when a conductor is inserted through the aligned holes in the panel and clip from the side of the leg having the embossed hole, the end of the finger frictionally engages the conductor and makes electrical contact therewith, the conductor positively locking the clip to the panel. The clip electrically interconnects printed circuits on opposite sides of the panel engaged by the legs of the clip and electrically connects such circuits to the conductor.

Because the holes in the clip are at least partially covered by a spring finger in a leg of the clip, no change in dimensions of the holes in the clip is necessary for accommodation of several different sizes of wire conductors and precision tooling such as would be required for punching very small holes is made unnecessary. The clip can be readily manufactured by stamping or punching a strip of spring metal, such as beryllium copper, which is then formed into the desired shape and heat treated to relieve strain. Preferably the clip is so formed that the legs thereof converge slightly to provide spring pressure against the surfaces of the panel and thereby insure good electrical connection to printed circuits on both sides of the panel.

For a better understanding of the invention and of the advantages thereof reference may be had to the accompanying drawings of which:

Figure 1:
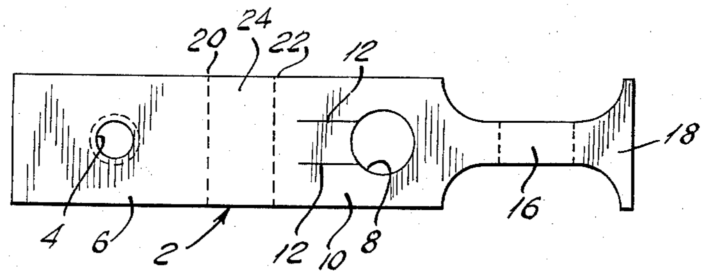
Fig. 1 is a plan view on an enlarged scale of a punched or stamped metal blank from which can be formed a connector clip embodying the invention.
Figure 2:
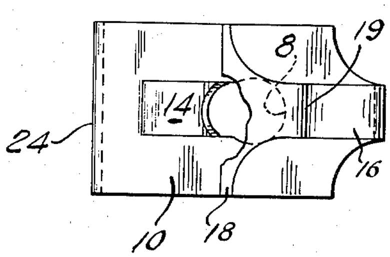
Fig. 2 is a plan view of a completed connector clip made from the blank of Fig. 1.
Figure 3:
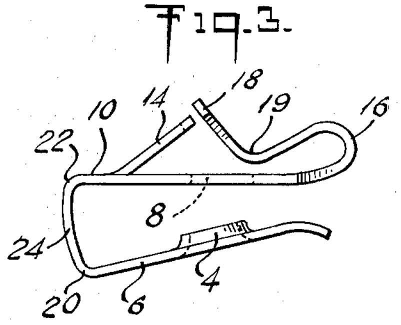
Fig. 3 is a side view of the clip of Fig. 2.
Figure 4:
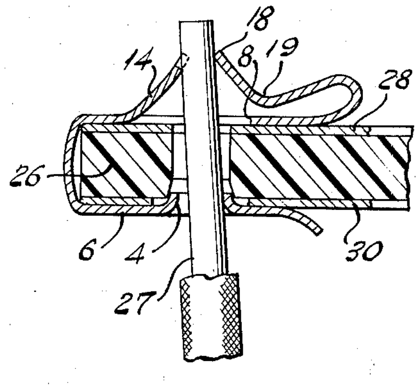
Fig. 4 is a sectional view showing the clip of Figs. 2 and 3 mounted on a panel and locked thereto by a conductor in electrical contact therewith.

In Fig. 1 is shown a metal blank strip 2 from which the clip of Figs. 2 through 4 may be formed. The strip 2 has a pertused hole 4 punched through a portion destined to be one leg 6, of the completed clip and a hole 8 punched through another portion destined to be the other leg 10 of the clip. Two cuts 12 are made in the strip extending from the hole 8 away from the adjacent end of the strip, the material between the cuts, when bent away from the plane of the strip, serving in the completed clip as a conductor engaging spring finger 14. The diameters of the holes 4 and 8 are at least slightly greater than the diameter of the largest conductor to be accommodated therein. Portions of the sides of the strip 2 between the hole 8 and the adjacent end of the strip 2 are cut away to leave a relatively narrow neck 16 terminating in a tongue 18 which, in the completed clip, also serves as a conductor engaging spring finger.

To form the clip of Figs. 2 through 4 from the strip blank 2, the strip is bent at the areas indicated by the dashed lines 20 and 22 to bring the hole 8 generally in alignment with hole 4 and then the neck portion 16 is curved back upon itself and the tongue 18 bent upwardly at 19 to bring the edge thereof over the hole 8 to serve as a conductor engaging spring finger. The part 14 between the cuts 12 is bent up from the upper leg of the clip to serve as a second conductor engaging spring finger. The clip is then heat treated to remove strain. The legs, in the unattached position of Fig. 3, preferably converge slightly so that when the connector is slipped over the edge of a panel, the legs are sprung apart by the panel and engage the panel and any circuits thereon under pressure. When the legs of the clip normally converge, as above described, the length of the section 24 which interconnects the legs can be made long enough to accommodate panels of varying thickness and contact pressure will be maintained irrespective of differential expansion and contraction of the clip and panel with change in temperature or moisture content.

In the use of the above described connector a hole is made through a panel, such as panel 26 of Fig. 4, and the connector is slipped over the edge of the panel to bring the hole 4 in alignment with the hole in the panel. A conductor 27 is then introduced through the hole 4 and panel hole and pushed up until it is engaged by and locked between the tongue 18 and finger 14, the conductor spreading the tongue and finger against their spring bias and positively locking the connector clip to the panel. The tongue 18 and finger 14 scrape oxidation, corrosion, lubricant, wax or other foreign materials from the conductor 27, thus enhancing positive electrical contact between the conductor and clip. The construction of tongue or finger 18 and of finger 14 permit entry of conductor 27 in the direction from hole 4, through the panel and continuing in this direction, by opening outwardly. Conductor 27 is prevented from a withdrawal in the opposite direction by finger 18 and finger 14 both of which are forced into the conductor surface by the slightest perception of withdrawal movement. Also, the flexing of the turned back portion of leg 10 resulting from insertion of the conductor tends to increase contact pressure between the leg and flat conductors on the panel engaged thereby. When the hole in the panel passes through circuit elements such as elements 28 and 30 on the opposite surfaces of the panel, electrical continuity between such elements is provided by the clip, the legs of which engage these elements under pressure. No soldering between the conductor and terminal clip or between the terminal clip and the circuit elements on the panel is necessary. The burred lip about the hole 4 in leg 6 of the connector enters the hole in the panel and effectively holds the connector in place on the panel even prior to the insertion of the conductor. If the open end of leg 6 is bent slightly downwardly from the plane of the leg, ready removal of the clip can be effected by outward pressure on this free end. The downward curvature of the free end of the leg 6 and the folded over portion of the leg 10 also facilitate assembly of the clip connector to the panel. A conductor, once introduced into the connector, can be removed either by manually lifting the finger 18 away from the conductor to permit withdrawal thereof or alternatively the conductor may be cut flush to the leg 6 and the conductor stub automatically expelled by insertion of another conductor into the hole 4.

Because of the construction whereby the tongue 18 overlies the hole 8 in leg 10, and thereby effectively reduces the size thereof, the size of the hole 8 is not critical and does not require the use of small precision tools for punching or forming the hole in the connector.

Where the circuits of the panel are to be connected to external connectors other than points adjacent the periphery of the panel, obviously a suitable opening or slot can be made in the panel to provide an adjacent edge over which the connector clip can be slipped.

Although it is preferred that the legs of the connector converge, as heretofore described, this is not essential as good electrical continuity between circuits on both sides of the panel can be obtained with parallel legs. Parallel legs can also be used, for example, where it is desired to relieve strain on a wire conductor that is connected to the panel or to equipment mounted thereon at some remote point.

Figure 5:
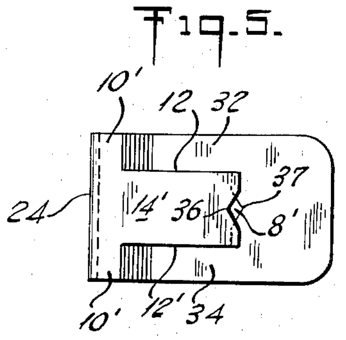
Fig. 5 is a plan view of a clip representing another embodiment of the invention.
Figure 6:
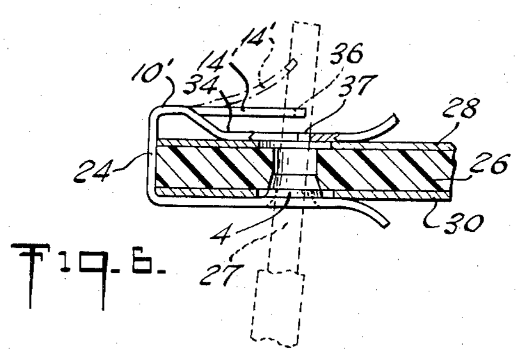
Fig. 6 is a sectional view of the clip of Fig. 5 mounted on a panel.

The embodiment of the invention illustrated in Figs. 5 and 6 differs from that of Figs. 1 to 4 primarily in the construction of the upper leg 10′ thereof. In this embodiment of the invention the end of the upper leg is not turned back to form a conductor engaging finger. A hole 8′ aligned with the hole 4 in the lower leg is punched in the upper leg and cuts 12′ extend from the hole 8′ toward the connecting side 24 of the clip to form a finger 14′ therebetween. The hole 8′ may be of any shape. In the specific embodiment of the invention illustrated in Figs. 5 and 6 the hole 8′ is shown as of diamond shape. Lengths 32 and 34 on opposite sides of the cuts 12′ are stepped down away from the plane of the finger 14′ so that the end of the finger overlies part of the hole 8.′ When the hole 8′ is diamond shaped a notch 36 in the end of the finger 14′ together with the notch 37 in the opposite side of the hole 8′ serve to centrally locate a conductor when the clip is mounted on the panel. Because the finger 14′ is brought into position to overlie part or all of the hole 8′ by the stepping down of the lengths 32 and 34 a relatively large hole may be punched in the upper leg during manufacture. Good electrical contact of the clip with a conductor is insured because the finger 14′, when forced upwardly by the conductor into the position shown in dotted lines in Fig. 6 forces the conductor against the opposite edge of the hole 8′. The wire is thus in firm electrical contact with both the finger and the upper leg of the clip and when the legs of the clip engage circuit elements on the panel the conductor is electrically connected thereto through the clip.

The legs of the clip shown in Fig. 6 are generally parallel and not disposed in converging planes as in the case of the clip of Fig. 3. In mounting the clip of Fig. 6 on the panel 26 the legs are sprung apart sufficiently to introduce the lip of hole 4 into the hole in the panel. Obviously, if desired, the clip of Figs. 5 and 6 could be made with legs in converging planes as in the embodiment of the invention illustrated in Figs. 2 through 4 to provide the additional spring pressure of the legs against the printed circuit elements, such as elements 28 and 30, of the panel. Conversely, the legs of the clip of Figs. 2 through 4 could be generally parallel. The parallel leg type of clip, whether of the upper leg construction of the embodiments of Figs. 2 through 4, or of the upper leg construction of Figs. 5 and 6, is particularly suited for use where the clip is primarily designed to relieve strain on a conductor one end of which is connected at a remote point to some other element mounted on the panel.

Figure 7:
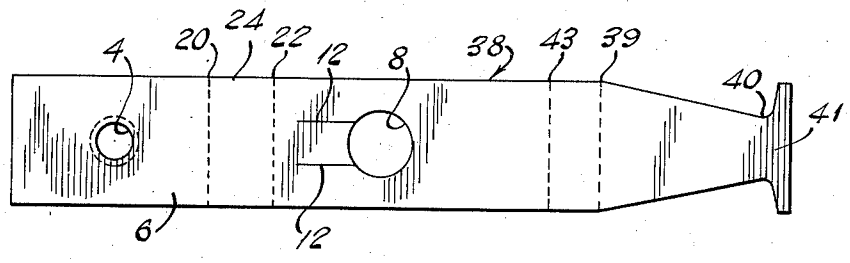
Fig. 7 is a plan view of a punched or stamped metal blank from which can be formed a connector clip representing another embodiment of the invention.
Figure 8:
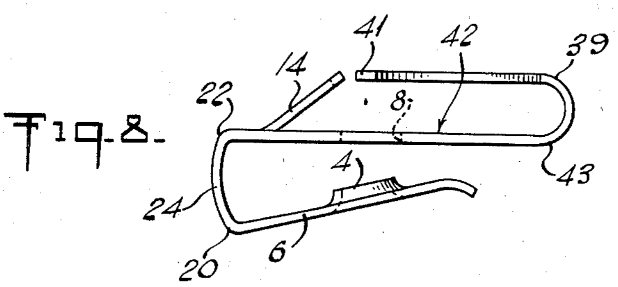
Fig. 8 is a side view of a completed connector clip made from the blank of Fig. 7.
Figure 9:
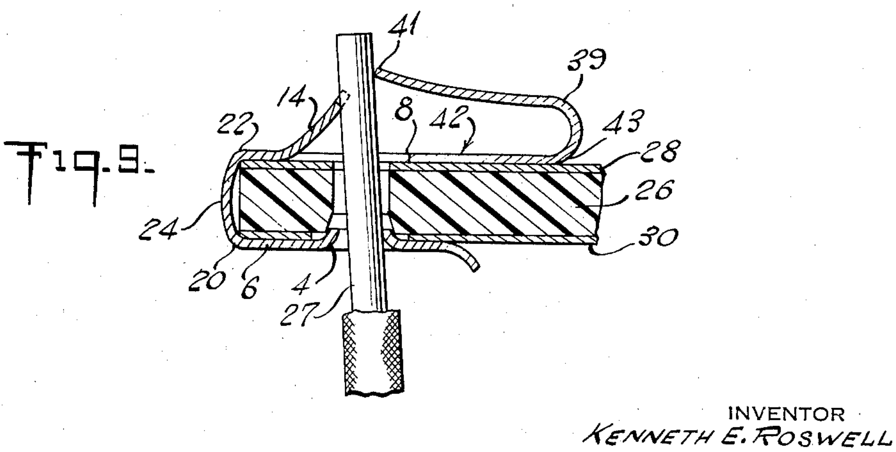
Fig. 9 is a sectional view showing the clip of Fig. 8 mounted on a panel and locked thereto by a conductor.

In the embodiment of the invention illustrated in Figs. 7 to 9, now to be described, a connector generally similar to that of Figs. 1 through 4 is shown. The blank 38 of Fig. 7 from which the clip is formed differs from that of Fig. 1 in the following respects. To the right, as viewed in Fig. 7, of the hole 8 the blank retains its full width to a location indicated by the dashed line 39 and then tapers gradually to a region 40 adjacent the far end where it widens abruptly in a tongue 41. To form the clip the blank 38 is bent about the lines 20 and 22 to bring the hole 4 in the part destined to be the leg 6 generally under the hole 8 as in the formation of the clip of Figs. 2 through 4. The upper leg 42 is then bent at the region between the dashed lines 43 and 39 to bring the tapering portion of the leg back over the upper leg and the terminal tongue 41 over the hole 8 to act as a spring finger. The metal between the cuts 12 is bent upwardly as in the earlier embodiment of the invention to form the spring finger 14. The formed clip is then heat treated to remove strain. Fig. 8 is a side view of the resulting clip when not mounted on a panel.

When the clip of Fig. 8 is mounted on a panel 26 and a wire conductor 27 is inserted through the hole 4, through the hole in the panel 26 and through the hole 8 in the upper leg, the wire engages the tongue or finger 41, urges it upwardly and flexes it slightly into the position shown in Fig. 9. The finger or tongue 41 forces the conductor against the end of finger 14, causing that finger to flex and bend upwardly. Thus, as in the earlier embodiments of the invention, the conductor is firmly grasped by the clip and good electrical connection is made between the conductor 27 and clip, and through the clip, between the conductor 27 and circuit elements 28 and 30 on the panel, the conductor 27 locking the clip on to the panel and the fingers of the clip preventing retraction of the conductor. The construction of this embodiment of the invention by maintaining full width in the part where the upper leg is turned back on itself strengthens the clip at this region and thereby simplifies the construction by eliminating any additional bending operations in the upper leg, as for example at the bend indicated at 19 of Fig. 3.

The invention has now been described with respect to three embodiments thereof. It will be apparent from the foregoing description that the new conductor avoids the necessity for providing conventional terminal lugs for attachment to conductors, does not require the use of solder, is light in weight, is self-locking, provides good electrical contact to printed circuit elements and to conductors for connection thereto and has a long useful life. It is unnecessary to provide a metallic eyelet in the hole and/or a plated-through hole in the panel but the connector will work equally well should such an eyelet and/or plated-through hole be provided. Although the invention has been described with specific reference to printed circuit panels obviously the new clip may be used to interconnect any flat conductors on opposite sides of a panel whether or not the conductors are elements of a printed circuit and whether or not the conductors are embedded in the panel. Obviously various changes in the particular constructions illustrated can be made without departing from the spirit of the invention or the scope of the accompanying claims.

The following is claimed:

1. The combination which comprises a panel member with a flat electrical conductor in place thereon and a connector in the general form of a U shaped clip of electrically conductive spring metal the legs of which are engaged with opposite sides of said panel member, one of said legs being in contact with the said flat electrical conductor to form an electrical connection therewith without use of solder, said panel member having a wire receiving hole therein, each of the legs of said generally U shaped clip also having a wire receiving hole therein, which holes in the legs are positioned in alignment with the wire receiving hole in the panel member, the hole in one of said legs being formed with at least one resilient spring finger, the free end portion of which overlies the hole with the end edge of such spring finger being held in position to engage a separate wire conductor when inserted through such hole whereby the said separate wire conductor is gripped between the spring finger and an edge of the hole in such leg and is thereby conductively connected to the clip and to said flat conductor on the panel member and whereby the clip is locked in place on the panel member by means of the separate wire conductor without solder.

2. The combination specified in claim 1 wherein the hole in one of said legs is embossed to provide a lip for insertion into the hole in the panel.

3. The combination specified in claim 1 wherein the end portion of one of said legs of the generally U shaped clip is curved back over itself to terminate over the hole in such leg and form the said spring finger.

4. The combination specified in claim 3 wherein the edge of the hole that cooperates with the spring finger to grip the separate wire conductor lies between two longitudinal slits extending from the hole toward the base of the U, the metal between the slits being pushed up from the place of the leg to form a second spring finger for gripping the separate wire conductor.

5. The combination specified in claim 1 wherein the end portion of one of said legs of the generally U shaped clip is curved back over itself and then angularly outward to terminate over the hole in such leg and form the spring finger thereof.

6. The combination specified in claim 1 wherein one of said legs has a pair of spaced generally longitudinal slits extending from the hole therein toward the base of the U and the metal of that leg at the end of said slits and on the exterior thereof is stepped to cause the hole in such leg to partially underlie the part of the leg between the slits, such last mentioned part comprising the spring finger.

7. The combination which comprises a panel member with printed electrical circuit thereon and a connector of spring metal having two spaced legs which resiliently engage opposite sides of said panel, said legs having an interconnecting strip formed integral therewith which strip has a length at least as great as the thickness of the panel, one of said legs being in contact with the printed circuit on said panel to form an electrical connection therewith without use of solder, a wire receiving hole in said panel, each of said legs having a hole therethrough which holes are positoned in alignment with the wire receiving hole in said panel, one of said legs having a spring finger formed integral therewith, the free end portion of said spring finger being in position to partially overlie the hole in the leg with the end edge of such end portion being held in position for frictional and conductive engagement with a separate wire conductor when inserted through the holes whereby the separate wire conductor locks the connector in position on the panel without use of solder.

References Cited in the file of this patent

UNITED STATES PATENTS

| | | |
|---|---|---|
| 2,172,302 | Tinnerman | Sept. 5, 1939 |
| 2,685,720 | Petri | Aug. 10, 1954 |
| 2,697,862 | Flora | Dec. 28, 1954 |
| 2,825,010 | Silverschotz | Feb. 25, 1958 |